US012559096B2

(12) United States Patent
Bowman et al.

(10) Patent No.: US 12,559,096 B2
(45) Date of Patent: Feb. 24, 2026

(54) COLLISION PREDICTION AND PREVENTION FOR UNCREWED VEHICLES

(71) Applicant: AeroVironment, Inc., Simi Valley, CA (US)

(72) Inventors: William S. Bowman, Melbourne, FL (US); Mark B. Moffett, Grant, FL (US); Daniel R. Hedman, Palm Bay, FL (US); Michael E. Bowman, Satellite Beach, FL (US); Bryce Korte, Austin, TX (US); Matthew D. Summer, Melbourne, FL (US)

(73) Assignee: AeroVironment, Inc., Simi Valley, CA (US)

( * ) Notice: Subject to any disclaimer, the term of this patent is extended or adjusted under 35 U.S.C. 154(b) by 38 days.

(21) Appl. No.: 18/759,769

(22) Filed: Jun. 28, 2024

(65) Prior Publication Data

US 2026/0001529 A1      Jan. 1, 2026

(51) Int. Cl.
*B60W 30/09*          (2012.01)

(52) U.S. Cl.
CPC ......... *B60W 30/09* (2013.01); *B60W 2520/12* (2013.01); *B60W 2530/10* (2013.01)

(58) Field of Classification Search
CPC .......................... B60W 30/09; B60W 2520/12
See application file for complete search history.

(56) References Cited

U.S. PATENT DOCUMENTS

| | | | | |
|---|---|---|---|---|
| 10,657,833 | B2 * | 5/2020 | Gomez Gutierrez .... | G08G 5/80 |
| 2019/0051193 | A1 * | 2/2019 | Gutierrez ................. | G08G 5/21 |
| 2023/0316924 | A1 | 10/2023 | Hruschka | |
| 2025/0085112 | A1 * | 3/2025 | Kim ........................ | B64G 3/00 |

FOREIGN PATENT DOCUMENTS

| | | |
|---|---|---|
| CN | 109917767 | 6/2019 |
| KR | 20230163274 | 11/2023 |
| WO | 2022133528 | 6/2022 |
| WO | 2026006329 | 1/2026 |

OTHER PUBLICATIONS

Sabetghadam B, Cunha R, Pascoal A. A Distributed Algorithm for Real-Time Multi-Drone Collision-Free Trajectory Replanning. Sensors (Basel). Feb. 26, 2022;22(5):1855. doi: 10.3390/s22051855. PMID: 35271001; PMCID: PMC8915008. (Year: 2022).*
International Search Report and Written Opinion issued Oct. 29, 2025, in International Application No. PCT/US2025/035070 (11 pages).

* cited by examiner

*Primary Examiner* — Tarek Elarabi
(74) *Attorney, Agent, or Firm* — Perkins Coie LLP

(57) ABSTRACT

Methods and systems are described herein for predicting collisions between uncrewed vehicles and preventing those collisions. A collision prevention system may generate collision spheroids for a multitude of uncrewed vehicles. Those collision spheroids may represent a plurality of three-dimensional points around each uncrewed vehicle. When the collision prevention system determines that collision spheroids corresponding to two uncrewed vehicles intersect, the collision prevention system may determine that a collision is imminent and may attempt to prevent the collision by causing one or both uncrewed vehicles to change velocity.

17 Claims, 6 Drawing Sheets

<u>600</u>

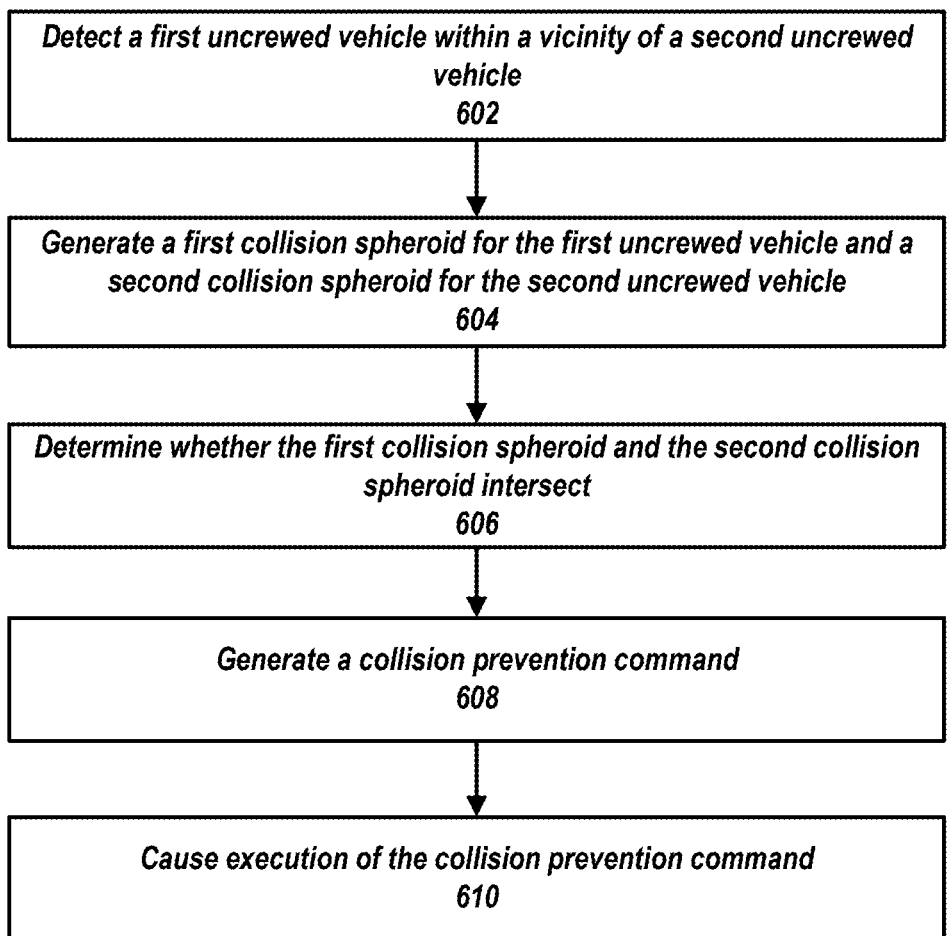

Detect a first uncrewed vehicle within a vicinity of a second uncrewed
vehicle
602

Generate a first collision spheroid for the first uncrewed vehicle and a
second collision spheroid for the second uncrewed vehicle
604

Determine whether the first collision spheroid and the second collision
spheroid intersect
606

Generate a collision prevention command
608

Cause execution of the collision prevention command
610

FIG. 6

COLLISION PREDICTION AND PREVENTION FOR UNCREWED VEHICLES

BACKGROUND

Stable and reliable robotic systems are becoming increasingly common, which has contributed to the recent advancement and proliferation of uncrewed system technologies. Generally, uncrewed systems (e.g., aerial uncrewed vehicles) are able to navigate using operator commands and/or using a global positioning system (GPS) to autonomously navigate to target locations. These uncrewed systems are designed to hold programming that enables the uncrewed system to receive a GPS signal, determine its location based on the GPS signal, and then navigate to a target location based on the combination of its location and the target location. As uncrewed systems become more common and more integrated, collision prediction and prevention for those uncrewed systems is becoming a larger issue. Although collision prevention systems exist for larger crewed aircraft, those systems require complex transponders and in some instances radar capability that does not exist in smaller uncrewed vehicles such as aerial drones. Accordingly, a mechanism is desired for providing collision prediction and prevention for uncrewed vehicles with smaller power sources and processing power.

SUMMARY

Therefore, methods and systems are described herein for predicting and preventing collisions among uncrewed vehicles. A collision prevention system may be used to perform the operations described herein. The collision prevention system may reside on a controller (e.g., a computing device being used by an operator to control one or more uncrewed vehicles), at a command-and-control point, and/or at an uncrewed vehicle. For example, a command-and-control point may be in a vehicle (e.g., a crewed vehicle) equipped with one or more computing devices, a datacenter that houses computing devices, or in another suitable environment. In instances where the collision prevention system is hosted at the uncrewed vehicle, uncrewed vehicles may be able to communicate with each other to transmit location information to each other along with other suitable information.

In some embodiments, the collision prevention system may perform the following operations when predicting and preventing collisions. The collision prevention system may detect a first uncrewed vehicle within a vicinity of a second uncrewed vehicle. For example, the collision prevention system may be built into a controller being used by an operator. The controller may control one or more uncrewed vehicles. Accordingly, the collision prevention system may be able to receive location and other data from multiple uncrewed vehicles. Thus, the collision prevention system may detect when two uncrewed vehicles are within a vicinity of each other (e.g., within a certain distance of each other). In some embodiments, the collision prevention system may be hosted on each uncrewed vehicle. Accordingly, uncrewed vehicles may be able to communicate with each other (e.g., via short range communicators) to determine relative locations. Based on those relative locations, the collision prevention system hosted on each uncrewed vehicle may be able to determine whether another uncrewed vehicle is within a predetermined distance. In yet some embodiments, a computing device at a command-and-control point may receive location data from multiple uncrewed vehicles and may determine whether two or more uncrewed vehicles are within the vicinity of each other.

The collision prevention system may generate collision spheroids, which may be represented by data structure. The collision spheroids may be used by the collision prevention system to predict collisions and prevent those collisions. In some embodiments, the collision spheroids may be generated based on detecting two uncrewed vehicles within a vicinity of each other. However, the collision spheroids may be constantly generated as uncrewed vehicles move around within three-dimensional space. Thus, the collision prevention system may generate a first collision spheroid for the first uncrewed vehicle based on a first velocity of the first uncrewed vehicle and a second collision spheroid for the second uncrewed vehicle based on a second velocity of the second uncrewed vehicle. The first collision spheroid may extend out from the first uncrewed vehicle and the second collision spheroid extends out from the second uncrewed vehicle.

Each collision spheroid may be represented by a multitude of points within three-dimensional space. That is, the first collision spheroid may include a first set of coordinates (e.g., with each coordinate having a latitude, longitude, and altitude) and the second collision spheroid may include a second set of coordinates (e.g., with each coordinate having a latitude, longitude, and altitude). Each point may have a latitude, a longitude, and an altitude. The number of points may depend on how accurately a global positioning system (GPS) device or devices are able to pinpoint the position of a particular uncrewed vehicle. For example, each point may be separated by a square meter, half a square meter, or by another suitable distance. The points may be stored within the memory of the controller, the memory of the uncrewed vehicle, and/or the memory of a computing device within a command-and-control point. Although this disclosure describes the point as shaped as a spheroid, other shapes may be possible (e.g., a rectangular prism). In some embodiments, the collision prevention system may generate the collision spheroids based on maneuverability of a particular uncrewed vehicle. For example, the longer it takes for the uncrewed vehicle to change course (e.g., based on weight, type of propulsion, turning radius, etc.) the longer/larger the collision spheroid may be. That is, the collision spheroid may be generated based on an amount of time to maneuver in combination with the speed of the uncrewed vehicle. It should be noted that if an uncrewed vehicle is not moving, the collision spheroid may be a collision sphere or another suitable shape (e.g., a collision cube).

The collision prevention system may then determine whether the first collision spheroid and the second collision spheroid intersect. For example, the collision prevention system may compare the three-dimensional points (e.g., latitude, longitude, and altitude) that represent each collision spheroid and determine whether any of the points match. If one or more of the points matches, the collision prevention system may determine that the first collision spheroid and the second collision spheroid intersect. Thus, this determination represents a collision prediction. In some embodiments, as the uncrewed vehicle or vehicles travel, the collision prevention system may keep updating the three-dimensional points (e.g., latitude, longitude, and altitude). Accordingly, the collision prevention system may continuously calculate whether two uncrewed vehicles are predicted to collide. That is, in some embodiments, the collision prevention system does not need to detect whether two or more uncrewed vehicles are within a vicinity of each other. In these embodiments, the collision prevention system may just detect when two or more uncrewed vehicles are predicted to collide based on comparing three-dimensional points, sometimes referred to as three-dimensional coordinates.

In some embodiments, based on determining that the first collision spheroid and the second collision spheroid intersect, the collision prevention system may generate a collision prevention command for the first uncrewed vehicle or for the second uncrewed vehicle. The collision prevention command may cause the first collision spheroid and the second collision spheroid to no longer intersect. For example, the collision prevention system may reside on a controller that an operator uses to control both uncrewed vehicles. Accordingly, the collision prevention system may generate a command for one of the uncrewed vehicles to change velocity (e.g., direction and/or speed) to prevent the other uncrewed vehicle. In some embodiments, two different commands may be generated.

In some embodiments, the collision prevention system may generate a prevention velocity for the first uncrewed vehicle, for the second uncrewed vehicle or for both. In particular, the collision prevention system may, based on determining that the first collision spheroid and the second collision spheroid intersect, generate a prevention velocity for the first uncrewed vehicle or for the second uncrewed vehicle. The prevention velocity (e.g., speed and direction) may cause the first collision spheroid and the second collision spheroid to no longer intersect. That is, to prevent a collision, the collision prevention system may calculate a velocity for one uncrewed vehicle or velocities for both uncrewed vehicles to prevent a collision. In some embodiments, the velocity or velocities may be included in a command to the uncrewed vehicle or within the commands to both uncrewed vehicles. In some embodiments, the command may be referred to as a collision prevention command.

The command or each command may be transmitted to a corresponding uncrewed vehicle. That is, the collision prevention system may transmit, to the first uncrewed vehicle or to the second uncrewed vehicle, a command to change velocity to the prevention velocity. That is, the collision prevention system may cause the first uncrewed vehicle or the second uncrewed vehicle to execute the collision prevention command. For example, the collision prevention system may be hosted on a controller used by an operator to control one or more uncrewed vehicles. Thus, the collision prevention system may be enabled to communicate with each uncrewed vehicle. The collision prevention system may use that communication system to transmit a collision prevention command to one of the unmanned vehicles. In some embodiments, two different collision prevention commands may be transmitted to two uncrewed vehicles.

Although the disclosed embodiments discuss the collision prevention system in terms of uncrewed vehicles, the collision prevention system may be used on crewed vehicles. Furthermore, while the disclosure discusses three-dimensional coordinates in terms of latitude, longitude, and altitude, other coordinate systems may be used, including two dimensional coordinates (e.g., for land-based vehicles where altitude is zero). The system may be used for watercraft as well, where altitude is zero. Likewise, the system may be used for underwater craft where altitudes may be negative.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 6 is a flowchart of operations for predicting and preventing collisions between uncrewed vehicles, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
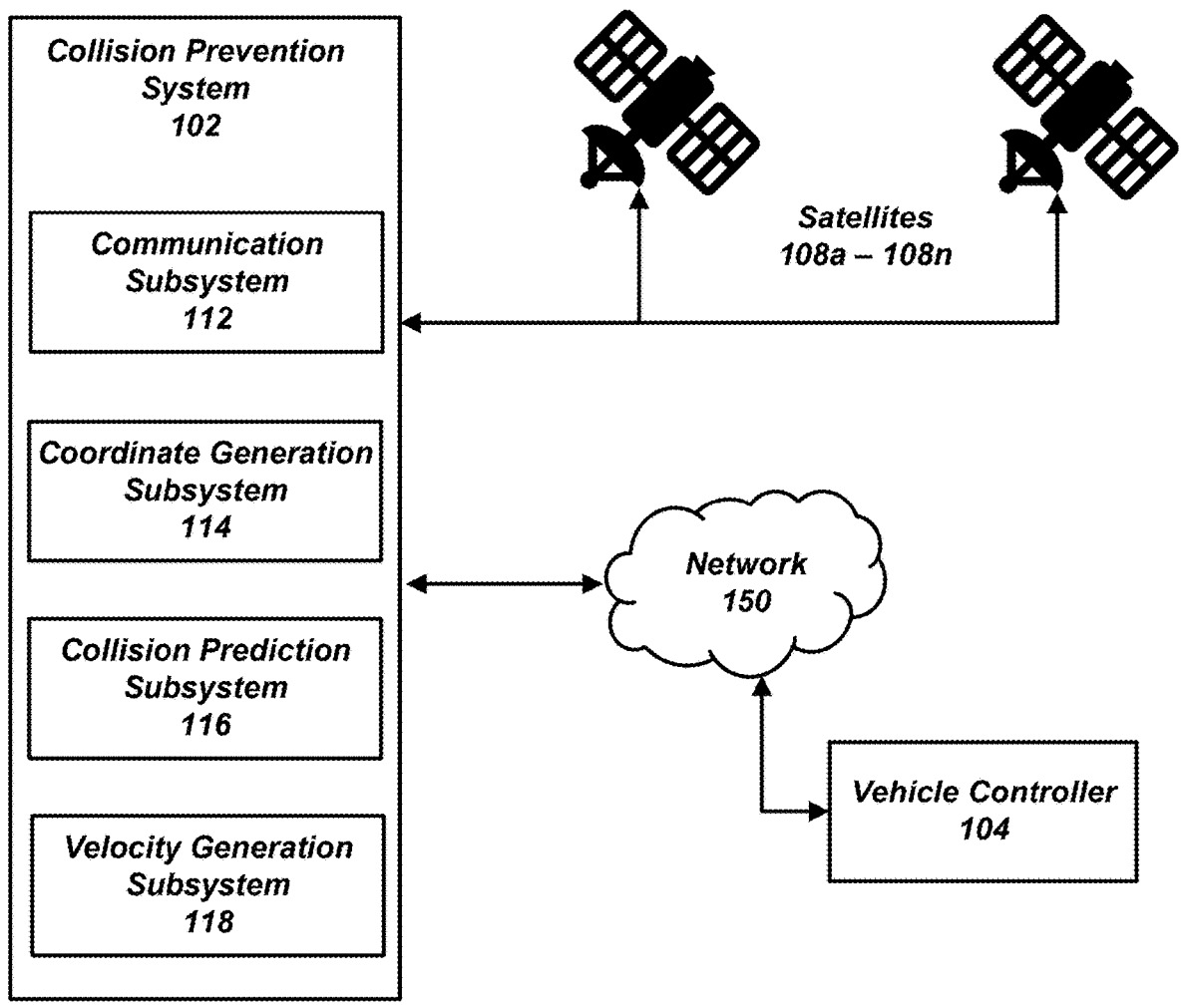
FIG. 1 shows an illustrative system for predicting and preventing collisions, in accordance with one or more embodiments of this disclosure.

FIG. 1 is an example of environment 100 for predicting and preventing collisions between uncrewed vehicles. Environment 100 includes collision prevention system 102, vehicle controller 104, and satellites 108a-108n. Collision prevention system 102 may execute instructions for predicting collisions between vehicles (e.g., uncrewed vehicles) and preventing those collisions. Collision prevention system 102 may include software, hardware, or a combination of the two. In some embodiments, although shown separately, collision prevention system 102 and vehicle controller 104 may reside on the same computing device.

Vehicle controller 104 may be used to control uncrewed vehicles. For example, vehicle controller 104 may be used by an operator to wirelessly transmit commands to one or more uncrewed vehicles. Furthermore, the vehicle controller may receive data (e.g., location data and other suitable data) from one or more uncrewed vehicles. Although vehicle controller 104 and collision prevention system 102 are shown separately, collision prevention system 102 may be hosted on the vehicle controller. Network 150 may be a local area network, a wide area network (e.g., the internet), or a combination of the two. Satellites 108a-108n may be commercial or other satellites that may be used to determine the location (e.g., GPS coordinates) of each uncrewed vehicle.

Collision prevention system 102 may detect a first uncrewed vehicle within a vicinity of a second uncrewed vehicle. For example, collision prevention system 102 may receive GPS coordinates from each uncrewed vehicle that is controlled by vehicle controller 104. The GPS coordinates may be received using communication subsystem 112. Communication subsystem 112 may include software components, hardware components, or a combination of both. For example, communication subsystem 112 may include a network controller (e.g., a wired/wireless network controller/processor) that is coupled with software to drive the controller/processor. The network controller may be built into a vehicle controller, an uncrewed vehicle, a device within a command-and-control point, or another suitable computing device. Communication subsystem 112 may pass the coordinates and other suitable data to coordinate generation subsystem 114.

Coordinate generation subsystem 114 may include software components, hardware components, or a combination of both. Coordinate generation subsystem 114 may track different uncrewed vehicles (e.g., based on received GPS locations) and determine when two uncrewed vehicles are detected within a vicinity of each other. For example, two uncrewed vehicles may be within a vicinity of each other when they are within one mile of each other, one kilometer, five hundred yards, or within another suitable predetermined distance. Thus, in some embodiments, collision prevention system 102 may not start other operations described above until two uncrewed vehicles are detected within a vicinity (e.g., with a predetermined distance) of each other. In some embodiments, collision prevention system 102 may detect when two uncrewed vehicles are within a vicinity of each other when a signal transmitted by one uncrewed vehicle is received by another uncrewed vehicle. For example, if collision prevention system 102 is hosted on an uncrewed vehicle, the uncrewed vehicle may detect a signal (e.g., a beacon) transmitted from another uncrewed vehicle.

In some embodiments, collision prevention system 102 may perform collision prediction and prevention without having to determine whether two or more uncrewed vehicles are within a vicinity of each other. That is, collision prediction and prevention may always be active. In particular, coordinate generation subsystem 114 may generate a first collision spheroid for the first uncrewed vehicle based on a first velocity of the first uncrewed vehicle and a second collision spheroid for the second uncrewed vehicle based on a second velocity of the second uncrewed vehicle. Each collision spheroid may be represented by a plurality of three-dimensional points with each three-dimensional point including a latitude, a longitude, and an altitude (e.g., GPS coordinates). In some embodiments, other coordinate systems may be used to represent collision spheroids. Thus, the first collision spheroid may include a first set of coordinates and the second collision spheroid may include a second set of coordinates (e.g., GPS coordinates each having a latitude, a longitude, and an altitude).

Figure 2:
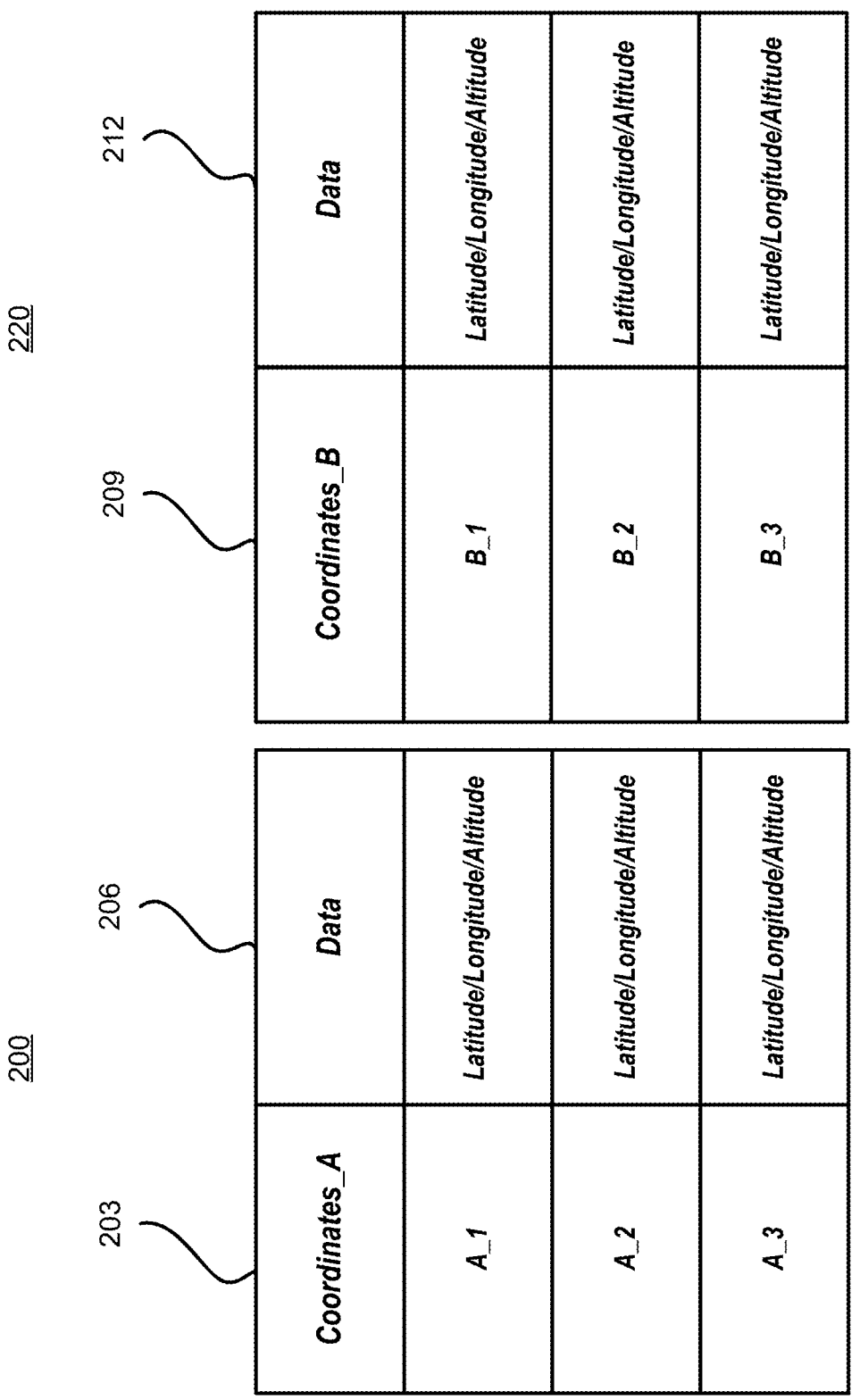
FIG. 2 illustrates an excerpt of a data structure that may store coordinates or points representing collision spheroids, in accordance with one or more embodiments of this disclosure.

FIG. 2 illustrates an excerpt of a data structure 200 that may store coordinates or points representing collision spheroids. Field 203 may include a coordinate identifier for each coordinate and field 206 may include data for the coordinate itself. For example, field 203 may include a hexadecimal, decimal, string, or another suitable identifier for a coordinate. Field 206 may include combination of a latitude, a longitude, and an altitude. In some embodiments, field 206 may not include an altitude. For example, if only land-based vehicles are involved, altitude may not be needed. As illustrated by FIG. 2, each uncrewed vehicle may be associated with a corresponding data structure of points/coordinates representing a corresponding collision spheroid. Thus, data structure 220 may represent another uncrewed vehicle (different from uncrewed vehicle represented by data structure 200). Data structure 220 may include field 209 storing coordinate identifiers and field 212 storing coordinates themselves.

Figure 3:
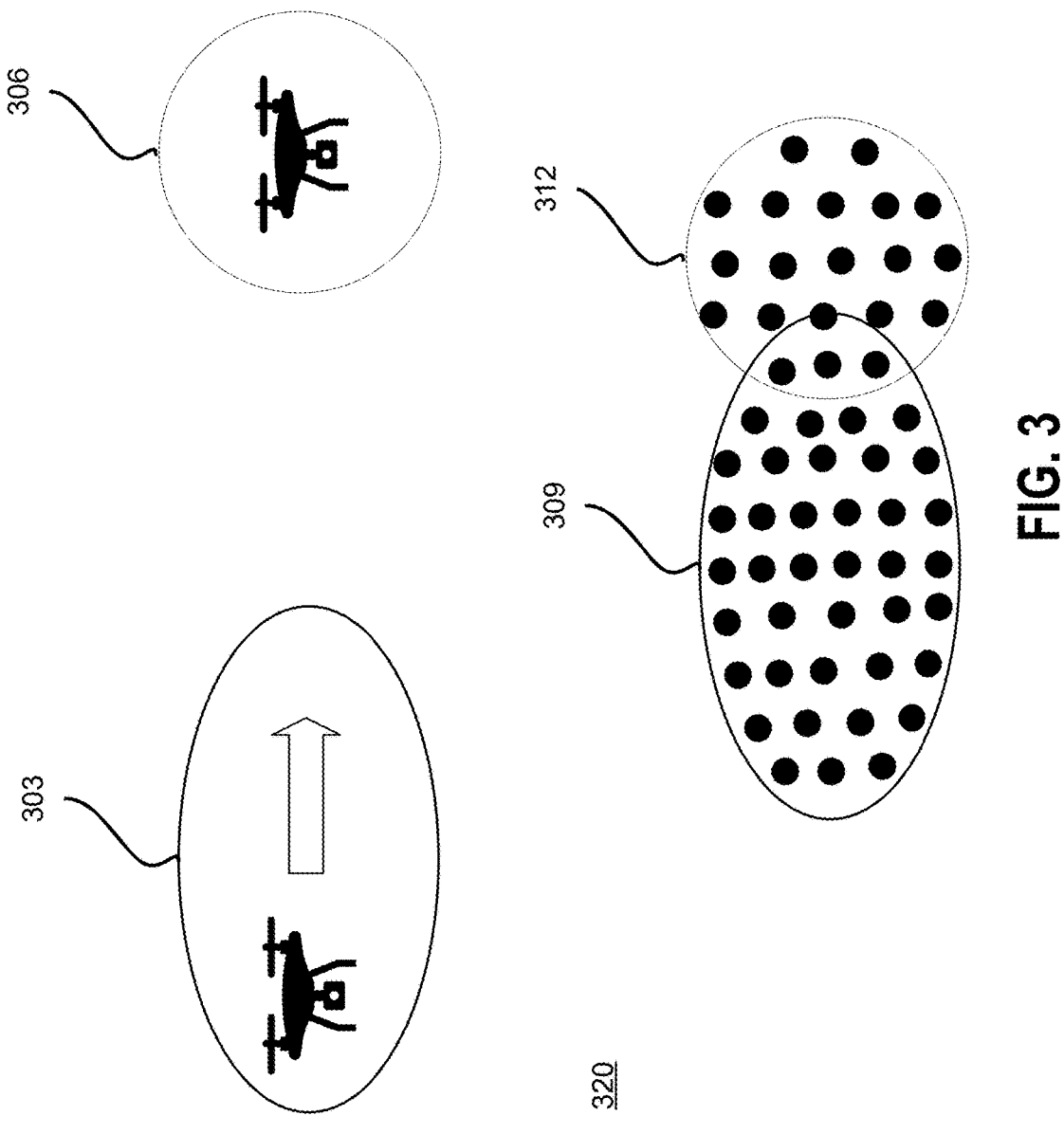
FIG. 3 illustrates an exemplary collision prediction between a stationary uncrewed vehicle and a moving uncrewed vehicle, in accordance with one or more embodiments of this disclosure.

When each collision spheroid is generated, the coordinates of each collision spheroid extend from the location (e.g., a GPS location) of the corresponding uncrewed vehicle. Thus, the first collision spheroid extends out from the first uncrewed vehicle and the second collision spheroid extends out from the second uncrewed vehicle. FIG. 3 shows an illustration 300 that demonstrates collision prediction between a stationary uncrewed vehicle and a moving uncrewed vehicle. Collision spheroid 303 illustrates a collision spheroid for a moving uncrewed vehicle that is moving towards an uncrewed vehicle with collision spheroid 306, representing a stationary uncrewed vehicle. Illustration 320 shows collision spheroid 309 having a plurality of three-dimensional points or coordinates intersecting a collision spheroid 312 representing a stationary uncrewed vehicle.

In some embodiments, coordinate generation subsystem 114 may use the following operations to generate the collision spheroids. Coordinate generation subsystem 114 may analyze parameters associated with each uncrewed vehicle. In particular, coordinate generation subsystem 114 may determine, for the first uncrewed vehicle, the first velocity, a first set of dimensions of the first uncrewed vehicle, and a first collision prevention time that indicates a first amount of time for the first uncrewed vehicle to prevent a collision. For example, coordinate generation subsystem 114 may determine a velocity of the first uncrewed vehicle with faster velocities requiring larger (more elongated) collision spheroids than slower velocities. The dimensions of the uncrewed vehicle enable coordinate generation subsystem 114 to determine how large to make the collision spheroid in directions other than that of the velocity of the corresponding uncrewed vehicle. Furthermore, the dimensions of the uncrewed vehicle may enable coordinate generation subsystem 114 to determine how large to make the collision spheroid for the uncrewed vehicle when that uncrewed vehicle is not moving. Collision prevention time may be predetermined and may be generated based on the type of vehicle, the type of propulsion and the size/weight of the vehicle. For example, the bigger the vehicle the more difficult it may be to maneuver that vehicle to change velocity to avoid the collision. Top speed and agility may also need to be determined for calculating collision prevention time.

Coordinate generation subsystem 114 may perform the same operations and use the same parameters for the second collision spheroid. In particular, coordinate generation subsystem 114 may determine, for the second uncrewed vehicle, the second velocity, a second set of dimensions of the second uncrewed vehicle, and a second collision prevention time that indicates a second amount of time for the second uncrewed vehicle to prevent the collision. In some embodiments, for stationary uncrewed vehicles, the collision prevention time may be set to zero.

Coordinate generation subsystem 114 may then calculate the first set of coordinates for the first collision spheroid based on the first velocity, the first set of dimensions of the first uncrewed vehicle, and the first collision prevention time. When calculating the coordinates coordinate generation subsystem 114 may determine the frequency of coordinates indicating how close to each other the coordinates will be generated (e.g., one foot, one meter, half a meter, etc.). This frequency may depend on how accurate the GPS device is able to measure the location of the uncrewed vehicle. Collision spheroid 309 illustrates coordinates for a moving uncrewed vehicle. It should be noted that the uncrewed vehicle is illustrated as moving along the horizontal axis. However, the uncrewed vehicle may be moving in all three dimensions. Thus, each coordinate may be a three-dimensional coordinate that includes longitude, latitude, and altitude. For example, coordinate generation subsystem 114 may calculate fifty coordinates that may represent collision spheroid 309.

Coordinate generation subsystem 114 may perform the same operation to calculate the coordinates for the second collision spheroid. In particular, coordinate generation subsystem 114 may calculate the second set of coordinates for the second collision spheroid based on the second velocity, the second set of dimensions of the second uncrewed vehicle, and the second collision prevention time. Coordinate generation subsystem 114 may then generate the first collision spheroid based on the first set of coordinates and the second collision spheroid based on the second set of coordinates. For example, coordinate generation subsystem 114 may generate a data structure for each uncrewed vehicle and may store the generated coordinates within corresponding data structures, as shown in FIG. 2.

When the collision spheroids are generated, they may be stored in memory as data structures. As uncrewed vehicles move and change velocity, coordinate generation subsystem 114 may update each collision spheroid. The updates may be performed at a particular frequency. Frequency of updates may be based on, for example, the communication rate between the uncrewed vehicles and the vehicle controller or a command-and-control point. For example, if each uncrewed vehicle updates its location every one second, the refresh/update rate may be one second. Other update rates may be used. Update rates may also depend on the amount of processing power and energy consumption. As the collision spheres are updated, the data may be accessed by collision prediction subsystem 116, to predict possible collisions.

Collision prediction subsystem 116 may include software components, hardware components, or a combination of both. For example, collision prediction subsystem 116 may include software components that access data in memory and/or storage and may use one or more processors to perform its operations. Collision prediction subsystem 116 may determine whether the first collision spheroid and the second collision spheroid intersect, thereby predicting whether a collision is likely to occur. In some embodiments, prediction subsystem 116 may determine, based on the first set of coordinates and the second set of coordinates, whether the first collision spheroid and the second collision spheroid intersect. The first set of coordinates may be associated with the first uncrewed vehicle while the second set of coordinates may be associated with the second uncrewed vehicle.

Figure 4:
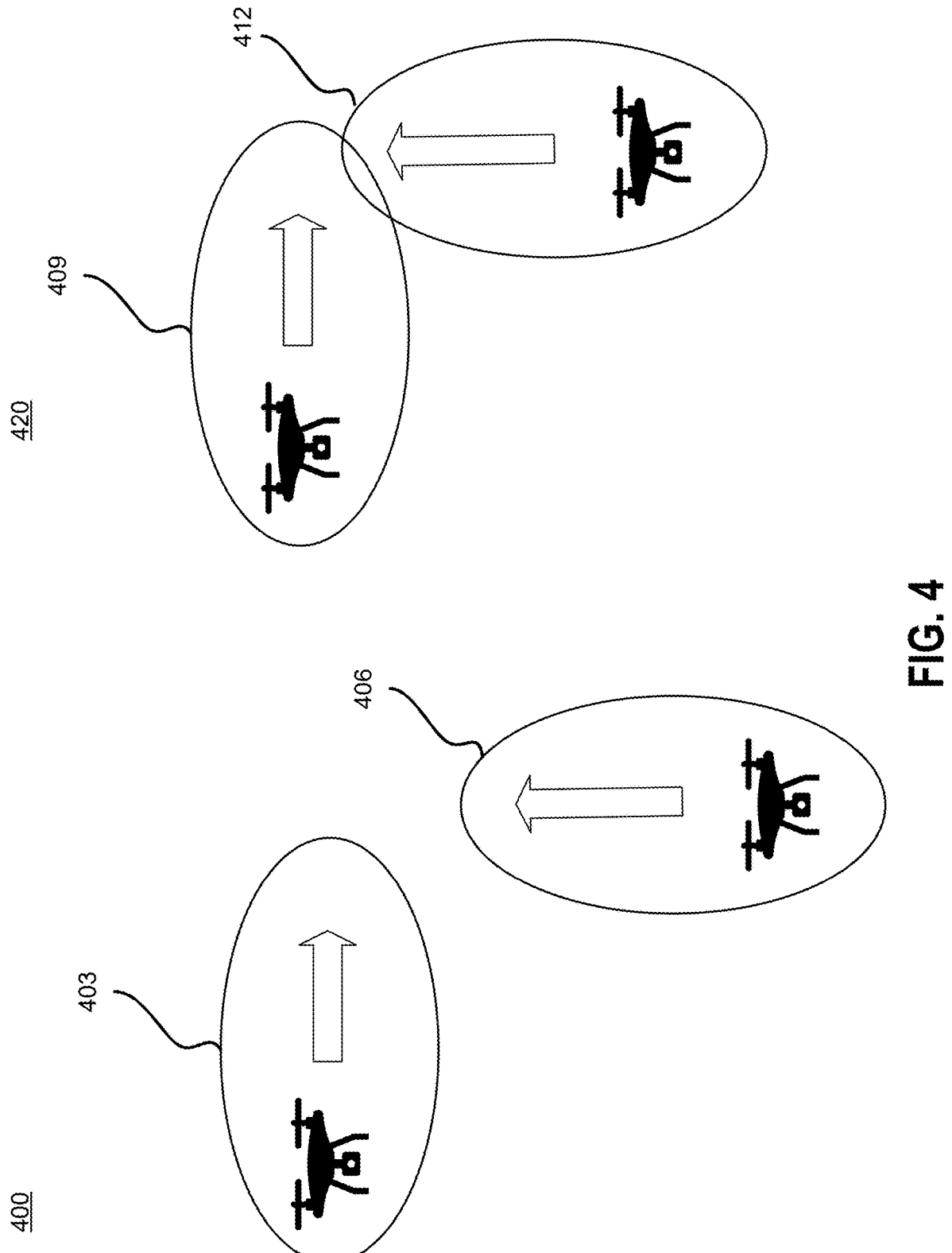
FIG. 4 illustrates an exemplary collision prediction between two moving uncrewed vehicles, in accordance with one or more embodiments of this disclosure.

FIG. 4 illustrates an exemplary collision prediction between two moving uncrewed vehicles. Illustration 400 shows a first uncrewed vehicle with a corresponding collision spheroid 403 and a second uncrewed vehicle with a corresponding collision spheroid 406. In this case, the first uncrewed vehicle and the second uncrewed vehicle are not predicted to collide. Illustration 420 of FIG. 4 illustrates a first uncrewed vehicle having a collision spheroid 409 that is predicted to collide with a second uncrewed vehicle having a collision spheroid 412.

Collision prediction subsystem 116 may perform the following operations when predicting whether two uncrewed vehicles are going to collide. Collision prediction subsystem 116 may determine the first set of coordinates and the second set of coordinates. For example, collision prediction subsystem 116 may retrieve a corresponding set of coordinates representing each collision spheroid for a corresponding uncrewed vehicle. In some embodiments, the first set of coordinates may include a first plurality of three-dimensional coordinates representing the first collision spheroid and the second set of coordinates may include a second plurality of three-dimensional coordinates representing the second collision spheroid. Furthermore, each coordinate may be within a predetermined distance of each other coordinate. As discussed above, the distance may be based on accuracy of GPS coordinates provided by a GPS device aboard each uncrewed vehicle. In some embodiments, each coordinate set may be a matrix of coordinates with each entry within a matrix representing a point within the three-dimensional space (e.g., longitude, latitude, and altitude).

Collision prediction subsystem 116 may then determine whether any coordinates within the first set of coordinates matches a coordinate within the second set of coordinates. For example, collision prediction subsystem 116 may execute a comparison operation between the coordinates within the two sets. In some embodiments, collision prediction subsystem 116 may determine that the coordinates match when two coordinates are between a predetermined distance from each other. For example, if two coordinates from different sets are within one meter, one foot, or within another suitable distance within each other, collision prediction subsystem 116 may determine that two coordinates match. Accordingly, based on determining that a first coordinate within the first set of coordinates matches a second coordinate within the second set of coordinates, collision prediction subsystem 116 may determine that the first collision spheroid intersects the second collision spheroid. When collision prediction subsystem 116 determines that two collision spheroids intersect, collision prediction subsystem 116 may predict that the two corresponding uncrewed vehicles will collide.

When collision prediction subsystem 116 determines that two uncrewed vehicles are predicted to collide, collision prediction subsystem 116 may generate a collision indication. The collision indication may be passed to velocity generation subsystem 118. Velocity generation subsystem 118 may include software components, hardware components, or a combination of both. For example, velocity generation subsystem 118 may include software components that access data in memory and/or storage and may use one or more processors to generate velocities and/or other collision prevention parameters. That is, velocity generation subsystem 118 may act upon a prediction of collision.

In some embodiments, velocity generation subsystem 118 may generate a command or a velocity change to prevent a collision. The command or velocity change may be for a particular uncrewed vehicle (e.g., one of the two uncrewed vehicles) that are predicted to collide. In some embodiments, velocity generation subsystem 118 may generate two commands and/or velocities for both uncrewed vehicles. Thus, velocity generation subsystem 118 may, based on determining that the first collision spheroid and the second collision spheroid intersect, generate a collision prevention command for the first uncrewed vehicle or for the second uncrewed vehicle. The collision prevention command may cause the first collision spheroid and the second collision spheroid to no longer intersect.

In some embodiments, the collision prevention command may be a command to change velocity. The change of velocity may be a change in direction and/or speed. In some embodiments, the change of velocity may include turning off propulsion for an aerial vehicle (e.g., a quadcopter) so that the aerial vehicle can drop to a lower altitude due to gravity. In some embodiments, the collision prevention command may be a command to initiate movement according to a prevention velocity. That is, velocity generation subsystem 118 may, based on determining that the first collision spheroid and the second collision spheroid intersect, generate a prevention velocity for the first uncrewed vehicle or for the second uncrewed vehicle. The prevention velocity may cause the first collision spheroid and the second collision spheroid to no longer intersect. For example, velocity generation subsystem 118 may generate a prevention velocity such that one or both uncrewed vehicles start moving in an opposite direction. In some embodiments, the change in velocity may be just a change in direction or speed, while in some embodiments, the change may be in both direction and speed. In yet some embodiments, velocity generation subsystem 118 may instruct one of the uncrewed vehicles to come to a complete stop for a particular amount of time until the other uncrewed vehicle passes the predicted point of collision.

In some embodiments, velocity generation subsystem 118 may make a determination as to which of the uncrewed vehicles should be required to change velocity. One mechanism for making that determination may be based on the maneuverability of each vehicle. For example, the determination may be made based on the prevention times of each vehicle. That is, velocity generation subsystem 118 may determine vehicles that are more maneuverable have smaller collision prevention times. Accordingly, velocity generation subsystem 118 may determine that the first collision prevention time is smaller than the second collision prevention time. As discussed above, collision prevention times may be predetermined based on the parameters of the particular uncrewed vehicle. Those times may be stored and access by velocity generation subsystem 118. Accordingly, velocity generation subsystem 118 may determine which uncrewed vehicle of the two predicted to collide has a smaller and/or a larger collision prevention time.

Based on determining that the first collision prevention time is smaller than the second collision prevention time, velocity generation subsystem 118 may cause the first uncrewed vehicle to perform a collision prevention maneuver. The collision prevention maneuver may cause the first uncrewed vehicle to change vehicle velocity. That is, velocity generation subsystem 118 may select an uncrewed vehicle with a smaller collision prevention time to perform a velocity change.

When velocity generation subsystem 118 determines which uncrewed vehicle should be one to change its velocity, velocity generation subsystem 118 may transmit a command to that uncrewed vehicle. That is, velocity generation subsystem 118 may transmit, to the first uncrewed vehicle or to the second uncrewed vehicle, a command to change velocity to the prevention velocity. In some embodiments, velocity generation subsystem 118 may also warn the operator of a predicted collision and also inform the operator as to the action that is about to be taken (e.g., a command being sent to an uncrewed vehicle). In some embodiments, velocity generation subsystem 118 may generate for display indications of two commands and two vehicles and may give an operator a choice to select one of the commands. Velocity generation subsystem 118 may receive a selection by the operator and execute/transmit the command according to the selection.

In some embodiments, velocity generation subsystem 118 may execute two commands to prevent a collision. The two commands may be executed on the corresponding uncrewed vehicles. For example, there may not be enough time to prevent a collision if one uncrewed vehicle changes velocity. However, there may be enough time if both uncrewed vehicles change velocities. Accordingly, velocity generation subsystem 118 may send commands to both uncrewed vehicles. Thus, velocity generation subsystem 118 may cause the first uncrewed vehicle or the second uncrewed vehicle to execute the collision prevention command.

In some embodiments, velocity generation subsystem 118 may use the following operations to determine an uncrewed vehicle to which to send a command to change velocity. Velocity generation subsystem 118 may determine, for the first uncrewed vehicle, a first maneuverability factor based on one of a first vehicle type, a first vehicle weight, a first set of degrees of freedom of movement, or first mission importance. For example, velocity generation subsystem 118 may determine a maneuverability factor based on one or more parameters of the uncrewed vehicle. Those parameters may include weight, maneuverability, degrees of freedom of movement, and or other vehicle parameters. In some embodiments, velocity generation subsystem 118 may take into account mission parameters when selecting which uncrewed vehicle should adjust velocity to prevent a collision.

Velocity generation subsystem 118 may also determine, for the second uncrewed vehicle, a second maneuverability factor based on one of a second vehicle type, a second vehicle weight, a second set of degrees of freedom of movement, or second mission importance. That is, velocity generation subsystem 118 may repeat the determination for each uncrewed vehicle that is predicted to be in a collision. In some embodiments, velocity generation subsystem 118 may generate for display, for an operator (e.g., on a display of vehicle controller 104) an option for the operator to select an uncrewed vehicle for velocity change. Velocity generation subsystem 118 may display parameters of each uncrewed vehicle and/or mission parameters to help the operator make a selection. Velocity generation subsystem 118 may then determine whether to send the collision prevention command to the first uncrewed vehicle or the second uncrewed vehicle based on the first maneuverability factor and the second maneuverability factor. Alternatively, velocity generation subsystem 118 may send the command based on operator selection.

In some embodiments, velocity generation subsystem 118 may simply select an uncrewed vehicle for sending the command based on a vehicle type. That is, velocity generation subsystem 118 may access a hierarchy of vehicle types to determine the vehicle for sending the command. In particular, velocity generation subsystem 118 may determine a first type associated with the first uncrewed vehicle and a second type associated with the second uncrewed vehicle. Vehicle types may include types based on population types, maneuverability types, and/or other suitable types. Velocity generation subsystem 118 may determine that the first type has greater maneuvering capability than the second type and may transmit the command to change the velocity to the first uncrewed vehicle. In some embodiments, the hierarchy of types may be a data structure indicating which uncrewed vehicles should be selected ahead of others. In some embodiments, instead of a hierarchy, the vehicle types may be stored in pairs, such as one vehicle type in a pair may be indicated to be one for a velocity change.

In some embodiments, collision detection may be executed during uncrewed vehicle landings. For example, a multitude of uncrewed vehicles may be instructed to land at a particular location (e.g., after returning from a mission). Because the command may be transmitted from a single vehicle controller (e.g., vehicle controller 104), all the uncrewed vehicles may be scheduled to land in the same place at the same time. Collision prevention system 102 may deal with this scenario as described below. Collision prediction subsystem 116 may determine that the first collision spheroid intersects the second collision spheroid. For example, collision prediction subsystem 116 may use the operations described above to determine that two uncrewed vehicles are predicted to collide. Collision prediction subsystem 116 may further determine that the altitude for the collision would be approaching zero, thereby determining that the collision is predicted during landing. That is, in response to determining that the first collision spheroid intersects the second collision spheroid, collision prediction subsystem 116 may determine that both the first uncrewed vehicle and the second uncrewed vehicle have a matching landing location. Furthermore, collision prediction subsystem 116 may determine that both uncrewed vehicles have a matching landing time.

Based on determining that both the first uncrewed vehicle and the second uncrewed vehicle have the matching landing location and the matching landing time, velocity generation subsystem 118 may generate a first landing command for the first uncrewed vehicle or a second landing command for the second uncrewed vehicle to execute a velocity change that causes the matching landing location to no longer match or the matching landing time to no longer match. For example, velocity generation subsystem 118 may generate a command for a given uncrewed vehicle to stop moving and hover for an amount of time that would enable another uncrewed vehicle to land and be moved from the landing platform (e.g., by an operator). In another example, velocity generation subsystem 118 may instruct the given uncrewed vehicle to land a certain distance away from other landing uncrewed vehicles, thereby preventing collisions during landing.

Computing Environment

Figure 5:
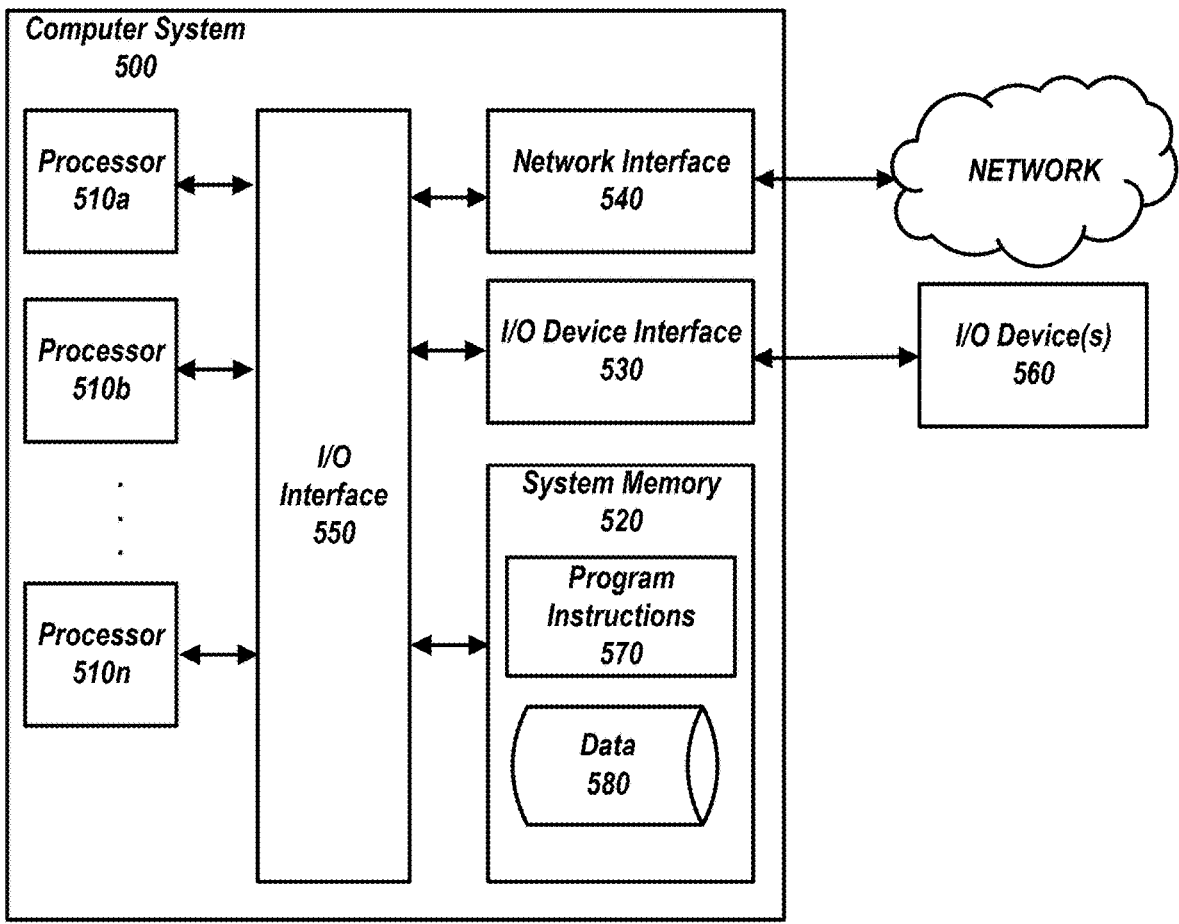
FIG. 5 illustrates a computing device, in accordance with one or more embodiments of this disclosure.

FIG. 5 shows an example computing system that may be used in accordance with some embodiments of this disclosure. In some instances, computing system 500 is referred to as a computer system. The computing system may be hosted on a device (e.g., a smartphone, a tablet, or another suitable device) that an operator may control. In some embodiments, the computing system may be hosted on a server at a command-and-control point or on a vehicle. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage media may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided or other additional functionality may be available.

Operation Flow

FIG. 6 is a flowchart 600 of operations for predicting collision between uncrewed vehicles and preventing those collisions. The operations of FIG. 6 may use components described in relation to FIG. 5. In some embodiments, collision prevention system 102 may include one or more components of computing system 500. At 602, collision prevention system 102 detects a first uncrewed vehicle within a vicinity of a second uncrewed vehicle. For example, the collision prevention system 102 may receive GPS coordinates of various uncrewed vehicles via network interface 540 from network 150. In some embodiments, collision prevention system 102 may receive the GPS coordinates at vehicle controller 104.

At 604, collision prevention system 102 generates a first collision spheroid for the first uncrewed vehicle and a second collision spheroid for the second uncrewed vehicle. For example, collision prevention system 102 may use one or more processors 510a, 510b, and/or 510n to perform the generation and may store the results in system memory 520. At 606, collision prevention system 102 determines whether the first collision spheroid and the second collision spheroid intersect. For example, collision prevention system 102 may use one or more processors 510a-510n to perform this operation.

At 608, collision prevention system 102 generates a collision prevention command. Collision prevention system 102 may perform this operation using one or more processors 510a, 510b, and/or 510n. Collision prevention system 102 may store the generated command in system memory 520. At 610, collision prevention system 102 causes execution of the collision prevention command. Collision prevention system 102 may use one or more processors 510a, 510b, and/or 510n and/or system memory 520 to perform this operation. Collision prevention system 102 may transmit the command from vehicle controller 104 using network interface 540 via network 150.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: detecting a first uncrewed vehicle within a vicinity of a second uncrewed vehicle; generating a first collision spheroid for the first uncrewed vehicle based on a first velocity of the first uncrewed vehicle and a second collision spheroid for the second uncrewed vehicle based on a second velocity of the second uncrewed vehicle, wherein the first collision spheroid extends out from the first uncrewed vehicle and the second collision spheroid extends out from the second uncrewed vehicle; determining whether the first collision spheroid and the second collision spheroid intersect; based on determining that the first collision spheroid and the second collision spheroid intersect, generating a collision prevention command for the first uncrewed vehicle or for the second uncrewed vehicle, wherein the collision prevention command causes the first collision spheroid and the second collision spheroid to no longer intersect; and causing the first uncrewed vehicle or the second uncrewed vehicle to execute the collision prevention command.

2. Any of the preceding embodiments, wherein generating the first collision spheroid and the second collision spheroid further comprises: determining, for the first uncrewed vehicle, the first velocity, a first set of dimensions of the first uncrewed vehicle, and a first collision prevention time that indicates a first amount of time for the first uncrewed vehicle to prevent a collision, and for the second uncrewed vehicle, the second velocity, a second set of dimensions of the second uncrewed vehicle, and a second collision prevention time that indicates a second amount of time for the second uncrewed vehicle to prevent the collision; calculating a first set of coordinates for the first collision spheroid based on the first velocity, the first set of dimensions of the first uncrewed vehicle, and the first collision prevention time; calculating, a second set of coordinates for the second collision spheroid based on the second velocity, the second set of dimensions of the second uncrewed vehicle, and the second collision prevention time; and generating the first collision spheroid based on the first set of coordinates and the second collision spheroid based on the second set of coordinates.

3. Any of the preceding embodiments, further comprising: determining that the first collision prevention time is smaller than the second collision prevention time; and based on determining that the first collision prevention time is smaller than the second collision prevention time, causing the first uncrewed vehicle to perform a collision prevention maneuver, wherein the collision prevention maneuver causes the first uncrewed vehicle to change vehicle velocity.

4. Any of the preceding embodiments, further comprising: determining, for the first uncrewed vehicle, a first maneuverability factor based on one of a first vehicle type, a first vehicle weight, a first set of degrees of freedom of movement, or first mission importance; determining, for the second uncrewed vehicle, a second maneuverability factor based on one of a second vehicle type, a second vehicle weight, a second set of degrees of freedom of movement, or second mission importance; and determining whether to send the collision prevention command to the first uncrewed vehicle or the second uncrewed vehicle based on the first maneuverability factor and the second maneuverability factor.

5. Any of the preceding embodiments, wherein determining whether the first collision spheroid and the second collision spheroid intersect further comprises: determining the first set of coordinates and the second set of coordinates, wherein the first set of coordinates comprises a first plurality of three-dimensional coordinates representing the first collision spheroid and the second set of coordinates comprises a second plurality of three-dimensional coordinates representing the second collision spheroid, and wherein each coordinate is within a predetermined distance of each other coordinate; determining whether any coordinates within the first set of coordinates matches a coordinate within the second set of coordinates; and based on determining that a first coordinate within the first set of coordinates matches a second coordinate within the second set of coordinates, determining that the first collision spheroid intersects the second collision spheroid.

6. Any of the proceeding embodiments, further comprising: determining that the first collision spheroid intersects the second collision spheroid; in response to determining that the first collision spheroid intersects the second collision spheroid, determining that both the first uncrewed vehicle and the second uncrewed vehicle have a matching landing location and a matching landing time; and based on determining that both the first uncrewed vehicle and the second uncrewed vehicle have the matching landing location and the matching landing time, generating a first landing command for the first uncrewed vehicle or a second landing command for the second uncrewed vehicle to execute a velocity change that causes the matching landing location to no longer match or the matching landing time to no longer match.

7. Any of the preceding embodiments, further comprising: determining a first type associated with the first uncrewed vehicle and a second type associated with the second uncrewed vehicle; determining that the first type has greater maneuvering capability than the second type; and transmitting the collision prevention command to change a velocity of the first uncrewed vehicle.

8. A tangible, non-transitory, machine-readable medium storing instructions that, when executed by a data processing apparatus, cause the data processing apparatus to perform operations comprising those of any of embodiments 1-7.

9. A system comprising: one or more processors; and memory storing instructions that, when executed by the processors, cause the processors to effectuate operations comprising those of any of embodiments 1-7.

10. A system comprising means for performing any of embodiments 1-7.

11. A system comprising cloud-based circuitry for performing any of embodiments 1-7.

What is claimed is:

1. A system for collision prediction and prevention for uncrewed vehicles, the system comprising:

one or more processors; and one or more non-transitory, computer-readable storage media storing instructions, which when executed by the one or more processors cause the one or more processors to perform operations comprising:

detecting a first uncrewed vehicle within a vicinity of a second uncrewed vehicle;

determining, for the first uncrewed vehicle, a first velocity, a first set of dimensions of the first uncrewed vehicle, and a first collision prevention time that indicates a first amount of time for the first uncrewed vehicle to prevent a collision, and for the second uncrewed vehicle, a second velocity, a second set of dimensions of the second uncrewed vehicle, and a second collision prevention time that indicates a second amount of time for the second uncrewed vehicle to prevent the collision;

calculating a first set of coordinates for generating a first collision spheroid based on the first velocity, the first set of dimensions of the first uncrewed vehicle, and the first collision prevention time;

calculating, a second set of coordinates for generating a second collision spheroid based on the second velocity, the second set of dimensions of the second uncrewed vehicle, and the second collision prevention time;

generating the first collision spheroid for the first uncrewed vehicle and the second collision spheroid for the second uncrewed vehicle, wherein the first collision spheroid extends out from the first uncrewed vehicle and the second collision spheroid extends out from the second uncrewed vehicle, and wherein the first collision spheroid comprises the first set of coordinates and the second collision spheroid comprises the second set of coordinates;

determining, based on the first set of coordinates and the second set of coordinates, whether the first collision spheroid and the second collision spheroid intersect;

based on determining that the first collision spheroid and the second collision spheroid intersect, generating a collision prevention velocity for the first uncrewed vehicle or for the second uncrewed vehicle, wherein the collision prevention velocity causes the first collision spheroid and the second collision spheroid to no longer intersect; and causing, the first uncrewed vehicle or to the second uncrewed vehicle, to execute a collision prevention command to change the first velocity or the second velocity to the collision prevention velocity.

2. The system of claim 1, wherein the instructions further cause the one or more processors to perform operations comprising:

determining that the first collision prevention time is smaller than the second collision prevention time; and based on determining that the first collision prevention time is smaller than the second collision prevention time, causing the first uncrewed vehicle to perform a collision prevention maneuver, wherein the collision prevention maneuver causes the first uncrewed vehicle to change vehicle velocity.

3. The system of claim 1, wherein the instructions further cause the one or more processors to perform operations comprising:

determining, for the first uncrewed vehicle, a first maneuverability factor based on one of a first vehicle type, a first vehicle weight, a first set of degrees of freedom of movement, or first mission importance;

determining, for the second uncrewed vehicle, a second maneuverability factor based on one of a second vehicle type, a second vehicle weight, a second set of degrees of freedom of movement, or second mission importance; and determining whether to send the collision prevention command to the first uncrewed vehicle or the second uncrewed vehicle based on the first maneuverability factor and the second maneuverability factor.

4. The system of claim 1, wherein the instructions for determining whether the first collision spheroid and the second collision spheroid intersect further cause the one or more processors to perform operations comprising:

determining the first set of coordinates and the second set of coordinates, wherein the first set of coordinates comprises a first plurality of three-dimensional coordinates representing the first collision spheroid and the second set of coordinates comprises a second plurality of three-dimensional coordinates representing the second collision spheroid, and wherein each coordinate is within a predetermined distance of each other coordinate;

determining whether any coordinates within the first set of coordinates matches a coordinate within the second set of coordinates; and based on determining that a first coordinate within the first set of coordinates matches a second coordinate within the second set of coordinates, determining that the first collision spheroid intersects the second collision spheroid.

5. The system of claim 4, wherein the instructions further cause the one or more processors to perform operations comprising:

determining that the first collision spheroid intersects the second collision spheroid;

in response to determining that the first collision spheroid intersects the second collision spheroid, determining that both the first uncrewed vehicle and the second uncrewed vehicle have a matching landing location and a matching landing time; and based on determining that both the first uncrewed vehicle and the second uncrewed vehicle have the matching landing location and the matching landing time, generating a first landing command for the first uncrewed vehicle or a second landing command for the second uncrewed vehicle to execute a velocity change that causes the matching landing location to no longer match or the matching landing time to no longer match.

6. The system of claim 1, wherein the instructions further cause the one or more processors to perform operations comprising:

determining a first type associated with the first uncrewed vehicle and a second type associated with the second uncrewed vehicle;

determining that the first type has greater maneuvering capability than the second type; and transmitting the collision prevention command to change the first velocity to the first uncrewed vehicle.

7. A method comprising:

detecting a first uncrewed vehicle within a vicinity of a second uncrewed vehicle;

determining, for the first uncrewed vehicle, a first velocity, a first set of dimensions of the first uncrewed vehicle, and a first collision prevention time that indicates a first amount of time for the first uncrewed vehicle to prevent a collision, and for the second uncrewed vehicle, a second velocity, a second set of dimensions of the second uncrewed vehicle, and a second collision prevention time that indicates a second amount of time for the second uncrewed vehicle to prevent the collision;

calculating a first set of coordinates for generating a first collision spheroid based on the first velocity, the first set of dimensions of the first uncrewed vehicle, and the first collision prevention time;

calculating, a second set of coordinates for generating a second collision spheroid based on the second velocity, the second set of dimensions of the second uncrewed vehicle, and the second collision prevention time;

generating, based on the first set of coordinates, the first collision spheroid for the first uncrewed vehicle and the second collision spheroid, based on the second set of coordinates, for the second uncrewed vehicle, wherein the first collision spheroid extends out from the first uncrewed vehicle and the second collision spheroid extends out from the second uncrewed vehicle;

determining, based on the first set of coordinates and the second set of coordinates, whether the first collision spheroid and the second collision spheroid intersect;

based on determining that the first collision spheroid and the second collision spheroid intersect, generating a collision prevention velocity for the first uncrewed vehicle or for the second uncrewed vehicle, wherein the collision prevention velocity causes the first collision spheroid and the second collision spheroid to no longer intersect; and causing the first uncrewed vehicle or the second uncrewed vehicle to execute a collision prevention command to change the first velocity or the second velocity to the collision prevention velocity.

8. The method of claim 7, further comprising:

determining that the first collision prevention time is smaller than the second collision prevention time; and based on determining that the first collision prevention time is smaller than the second collision prevention time, causing the first uncrewed vehicle to perform a collision prevention maneuver, wherein the collision prevention maneuver causes the first uncrewed vehicle to change vehicle velocity.

9. The method of claim 7, further comprising:

determining, for the first uncrewed vehicle, a first maneuverability factor based on one of a first vehicle type, a first vehicle weight, a first set of degrees of freedom of movement, or first mission importance;

determining, for the second uncrewed vehicle, a second maneuverability factor based on one of a second vehicle type, a second vehicle weight, a second set of degrees of freedom of movement, or second mission importance; and determining whether to send the collision prevention command to the first uncrewed vehicle or the second uncrewed vehicle based on the first maneuverability factor and the second maneuverability factor.

10. The method of claim 7, wherein determining whether the first collision spheroid and the second collision spheroid intersect further comprises:

determining the first set of coordinates and the second set of coordinates, wherein the first set of coordinates comprises a first plurality of three-dimensional coordinates representing the first collision spheroid and the second set of coordinates comprises a second plurality of three-dimensional coordinates representing the second collision spheroid, and wherein each coordinate is within a predetermined distance of each other coordinate;

determining whether any coordinates within the first set of coordinates matches a coordinate within the second set of coordinates; and based on determining that a first coordinate within the first set of coordinates matches a second coordinate within the second set of coordinates, determining that the first collision spheroid intersects the second collision spheroid.

11. The method of claim 10, further comprising:

determining that the first collision spheroid intersects the second collision spheroid;

in response to determining that the first collision spheroid intersects the second collision spheroid, determining that both the first uncrewed vehicle and the second uncrewed vehicle have a matching landing location and a matching landing time; and based on determining that both the first uncrewed vehicle and the second uncrewed vehicle have the matching landing location and the matching landing time, generating a first landing command for the first uncrewed vehicle or a second landing command for the second uncrewed vehicle to execute a velocity change that causes the matching landing location to no longer match or the matching landing time to no longer match.

12. The method of claim 7, further comprising:

determining a first type associated with the first uncrewed vehicle and a second type associated with the second uncrewed vehicle;

determining that the first type has greater maneuvering capability than the second type; and transmitting the collision prevention command to change a velocity of the first uncrewed vehicle.

13. One or more non-transitory, computer-readable media storing instructions thereon, wherein the instructions cause one or more processors to perform operations comprising:

detecting a first uncrewed vehicle within a vicinity of a second uncrewed vehicle;

determining, for the first uncrewed vehicle, a first velocity, a first set of dimensions of the first uncrewed vehicle, and a first collision prevention time that indicates a first amount of time for the first uncrewed vehicle to prevent a collision, and for the second uncrewed vehicle, a second velocity, a second set of dimensions of the second uncrewed vehicle, and a second collision prevention time that indicates a second amount of time for the second uncrewed vehicle to prevent the collision;

calculating a first set of coordinates for generating a first collision spheroid based on the first velocity, the first set of dimensions of the first uncrewed vehicle, and the first collision prevention time;

calculating, a second set of coordinates for generating a second collision spheroid based on the second velocity, the second set of dimensions of the second uncrewed vehicle, and the second collision prevention time;

generating the first collision spheroid for the first uncrewed vehicle based on the first set of coordinates and the second collision spheroid for the second uncrewed vehicle based on the second set of coordinates, wherein the first collision spheroid extends out from the first uncrewed vehicle and the second collision spheroid extends out from the second uncrewed vehicle;

determining, based on the first set of coordinates and the second set of coordinates, whether the first collision spheroid and the second collision spheroid intersect;

based on determining that the first collision spheroid and the second collision spheroid intersect, generating a collision prevention velocity for the first uncrewed vehicle or for the second uncrewed vehicle, wherein the collision prevention velocity causes the first collision spheroid and the second collision spheroid to no longer intersect; and causing the first uncrewed vehicle or the second uncrewed vehicle to execute a collision prevention command to change the first velocity or the second velocity to the collision prevention velocity.

14. The one or more non-transitory, computer-readable media of claim 13, wherein the instructions further cause the one or more processors to perform operations comprising:

determining that the first collision prevention time is smaller than the second collision prevention time; and based on determining that the first collision prevention time is smaller than the second collision prevention time, causing the first uncrewed vehicle to perform a collision prevention maneuver, wherein the collision prevention maneuver causes the first uncrewed vehicle to change vehicle velocity.

15. The one or more non-transitory, computer-readable media of claim 13, wherein the instructions further cause the one or more processors to perform operations comprising:

determining, for the first uncrewed vehicle, a first maneuverability factor based on one of a first vehicle type, a first vehicle weight, a first set of degrees of freedom of movement, or first mission importance;

determining, for the second uncrewed vehicle, a second maneuverability factor based on one of a second vehicle type, a second vehicle weight, a second set of degrees of freedom of movement, or second mission importance; and determining whether to send the collision prevention command to the first uncrewed vehicle or the second uncrewed vehicle based on the first maneuverability factor and the second maneuverability factor.

16. The one or more non-transitory, computer-readable media of claim 13, wherein the instructions further cause the one or more processors to perform operations comprising:

determining the first set of coordinates and the second set of coordinates, wherein the first set of coordinates comprises a first plurality of three-dimensional coordinates representing the first collision spheroid and the second set of coordinates comprises a second plurality of three-dimensional coordinates representing the second collision spheroid, and wherein each coordinate is within a predetermined distance of each other coordinate;

determining whether any coordinates within the first set of coordinates matches a coordinate within the second set of coordinates; and based on determining that a first coordinate within the first set of coordinates matches a second coordinate within the second set of coordinates, determining that the first collision spheroid intersects the second collision spheroid.

17. The one or more non-transitory, computer-readable media of claim 16, wherein the instructions further cause the one or more processors to perform operations comprising:

determining that the first collision spheroid intersects the second collision spheroid;

in response to determining that the first collision spheroid intersects the second collision spheroid, determining that both the first uncrewed vehicle and the second uncrewed vehicle have a matching landing location and a matching landing time; and based on determining that both the first uncrewed vehicle and the second uncrewed vehicle have the matching landing location and the matching landing time, generating a first landing command for the first uncrewed vehicle or a second landing command for the second uncrewed vehicle to execute a velocity change that causes the matching landing location to no longer match or the matching landing time to no longer match.

* * * * *